(12) United States Patent
Ruggero et al.

(10) Patent No.: US 8,662,797 B2
(45) Date of Patent: Mar. 4, 2014

(54) APPARATUS AND PROCESS FOR VACUUM CONVEYING OF POWDER PRODUCTS OR THE LIKE

(75) Inventors: Vincenzo Ruggero, Cervaro (IT); Gian Mario Arnoldi, Bonate Sotto (IT)

(73) Assignee: Agierre s.a.s. di Ruggero Vincenzo & C., Cassino (IT)

( * ) Notice: Subject to any disclaimer, the term of this patent is extended or adjusted under 35 U.S.C. 154(b) by 15 days.

(21) Appl. No.: 13/510,897

(22) PCT Filed: Dec. 1, 2010

(86) PCT No.: PCT/IB2010/055526
§ 371 (c)(1),
(2), (4) Date: May 31, 2012

(87) PCT Pub. No.: WO2011/073838
PCT Pub. Date: Jun. 23, 2011

(65) Prior Publication Data
US 2012/0243950 A1 Sep. 27, 2012

(30) Foreign Application Priority Data
Dec. 14, 2009 (IT) .............................. RM2009A0656

(51) Int. Cl.
*B65G 53/60* (2006.01)
*B65G 53/12* (2006.01)
*B01D 46/00* (2006.01)

(52) U.S. Cl.
CPC ............ *B65G 53/12* (2013.01); *B01D 46/0071* (2013.01); *B01D 46/0082* (2013.01)
USPC ......................................... 406/121; 406/172

(58) Field of Classification Search
USPC .......................................... 406/168, 171, 172
See application file for complete search history.

(56) References Cited

U.S. PATENT DOCUMENTS

| 3,144,165 | A |   | 8/1964 | Pegon et al. |
|-----------|---|---|--------|---------------|
| 4,013,321 | A | * | 3/1977 | Pendleton ...................... 406/171 |
| 4,372,713 | A |   | 2/1983 | Kean, Jr. |
| 4,465,497 | A | * | 8/1984 | Howeth .......................... 96/427 |
| 4,591,446 | A | * | 5/1986 | Muller ........................... 210/797 |
| 4,637,473 | A | * | 1/1987 | Gillis et al. ..................... 169/61 |
| 4,731,100 | A | * | 3/1988 | Loeffelmann et al. .......... 95/281 |

(Continued)

FOREIGN PATENT DOCUMENTS

| DE | 10306216 | 3/2004 |
|----|----------|--------|
| EP | 1477427 | 11/2004 |
| WO | 2007/096910 | 8/2007 |

OTHER PUBLICATIONS

PCT International Search Report completed on Mar. 23, 2011 for PCT/IB2010/055526 filed on Dec. 1, 2010 in the name of Vincenzo Ruggero.

(Continued)

*Primary Examiner* — William R Harp
(74) *Attorney, Agent, or Firm* — Steinfl & Bruno, LLP

(57) ABSTRACT

The present description relates to an apparatus and a process for vacuum-assisted pneumatic conveying of powder products, granules or the like. The apparatus comprises a container, a filtering unit (4) in the container and a rotary head with a nozzle (108) for washing the external wall of the filter unit (4). The apparatus provides a more immediate and efficient internal cleaning, allowing sterilization thus making the apparatus suitable for use also in the pharmaceutical sector.

16 Claims, 18 Drawing Sheets

(56) References Cited

U.S. PATENT DOCUMENTS

| | | | |
|---|---|---|---|
| 4,975,100 A * | 12/1990 | Ginelli | 96/397 |
| 5,139,370 A * | 8/1992 | Sazzarrini | 406/171 |
| 5,297,444 A | 3/1994 | Kriner et al. | |
| 5,358,552 A * | 10/1994 | Seibert et al. | 95/281 |
| 5,411,162 A | 5/1995 | Koziczkowski et al. | |
| 5,795,359 A * | 8/1998 | McLeish et al. | 96/233 |
| 6,007,120 A | 12/1999 | Vogt et al. | |
| 6,325,572 B1 * | 12/2001 | Dietrich | 406/171 |
| 7,534,278 B2 * | 5/2009 | Consoli et al. | 55/302 |
| 8,231,715 B2 * | 7/2012 | Gross et al. | 95/281 |
| 2005/0019107 A1 * | 1/2005 | Dietrich | 406/122 |
| 2005/0109376 A1 | 5/2005 | Gregory | |
| 2008/0142042 A1 | 6/2008 | Bramsen | |
| 2008/0145155 A1 | 6/2008 | Volkmann | |
| 2008/0197130 A1 | 8/2008 | Volkmann | |

OTHER PUBLICATIONS

PCT Written Opinion completed on Mar. 23, 2011 for PCT/IB2010/055526 filed on Dec. 1, 2010 in the name of Vincenzo Ruggero.

PCT International Preliminary Report on Patentability completed on Jan. 27, 2012 for PCT/IB2010/055526 filed on Dec. 1, 2010 in the name of Vincenzo Ruggero.

Agierre, Conveyor in Vacuum for Powder and Grain, Jan. 1, 2008, retrieved from URL:http://www.agierre.eu/gb/prodotti/trasporto_polveri/powder_%20and_%20grain_conveyor_%20in_vacuum%20.pdf, on May 18, 2012.

* cited by examiner

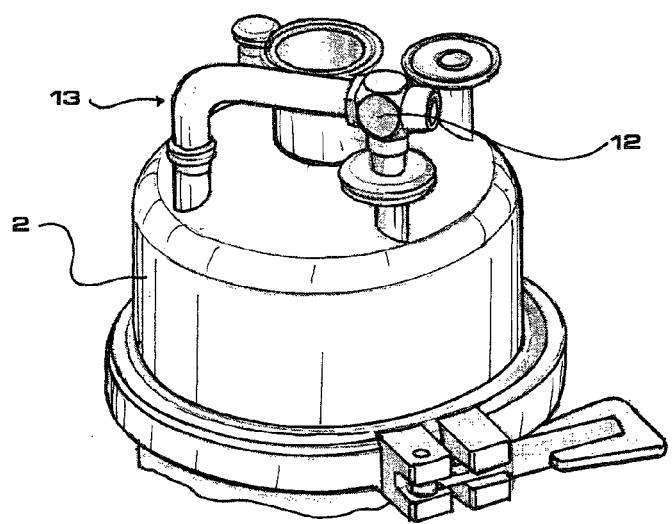
FIG.4
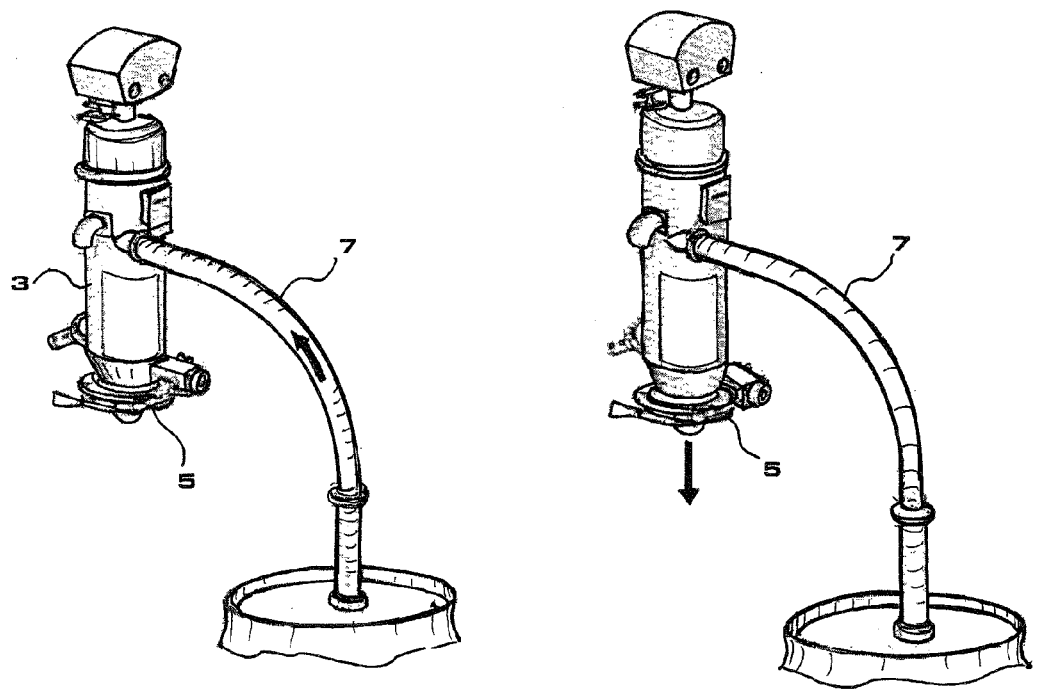
FIG.5  FIG.6

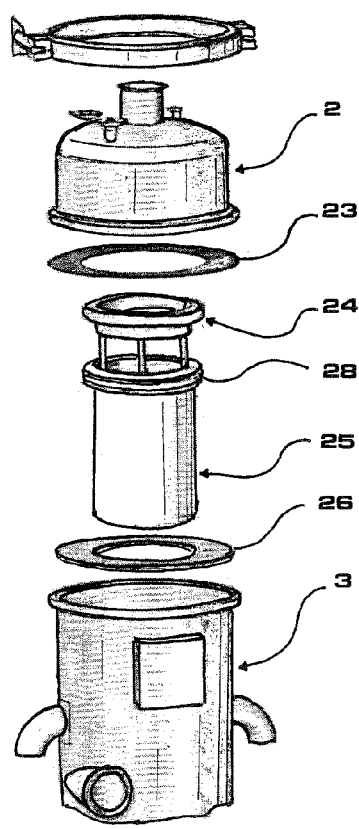
FIG.7A
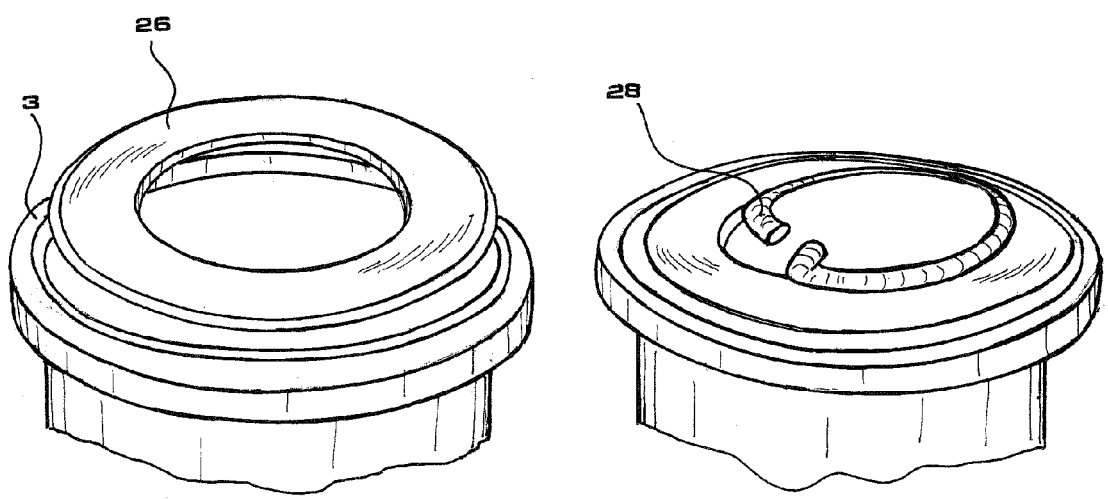
FIG.7B  FIG.7C

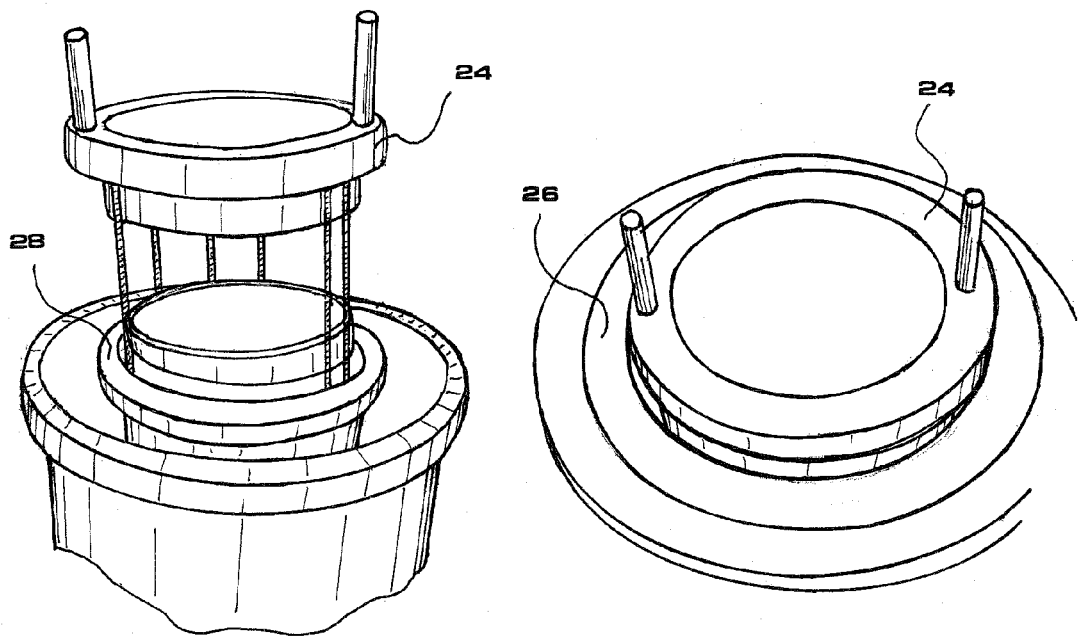
FIG.7D  FIG.7E
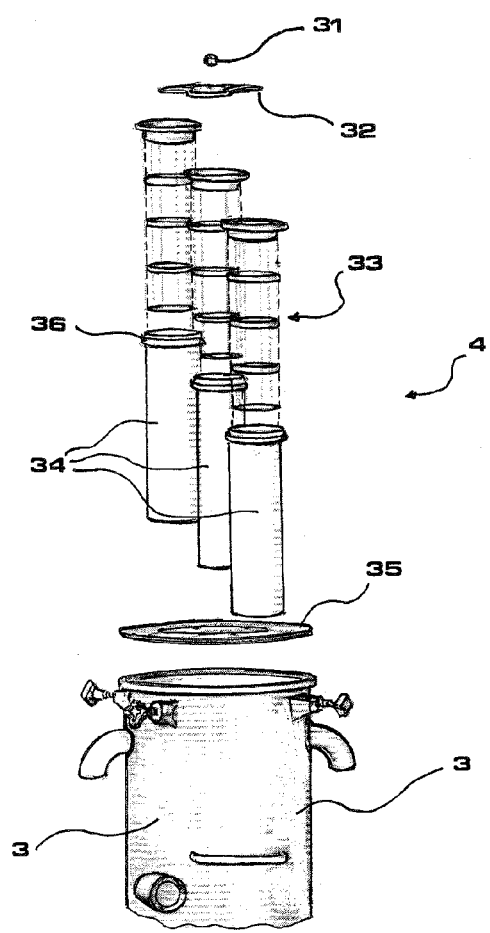
FIG.8A

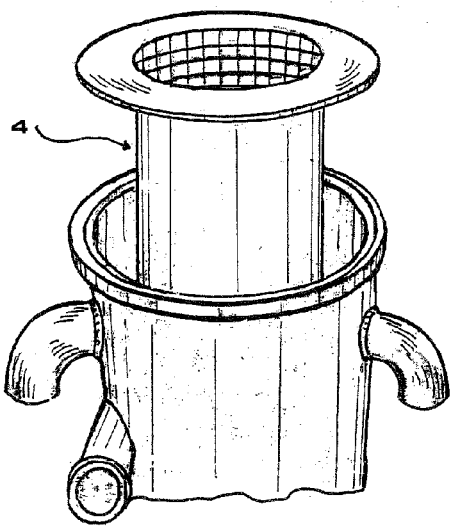
FIG.11C
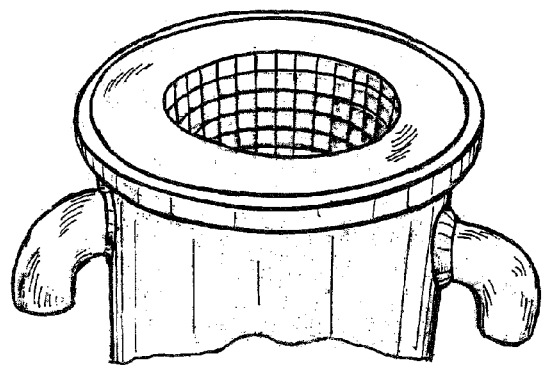
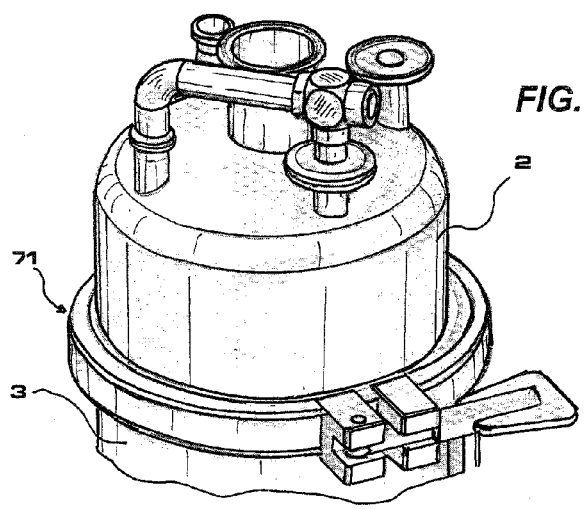
FIG.12
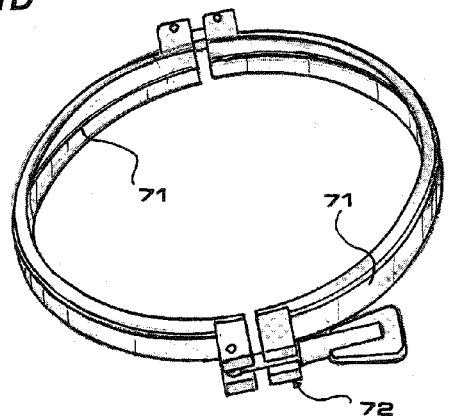
FIG.13
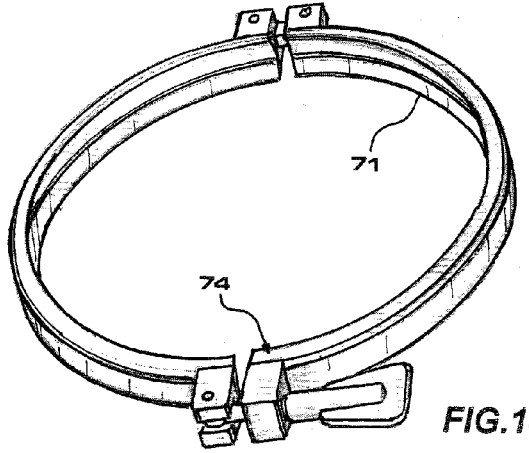
FIG.14
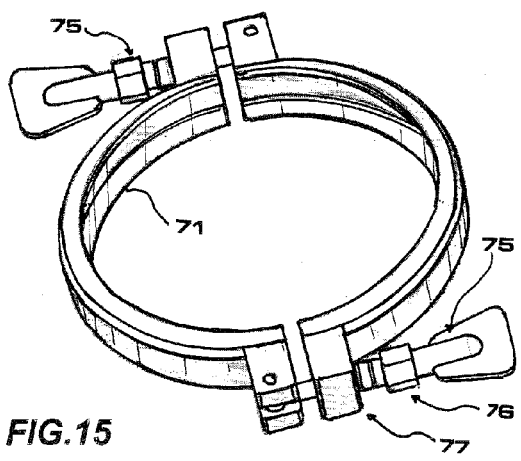
FIG.15

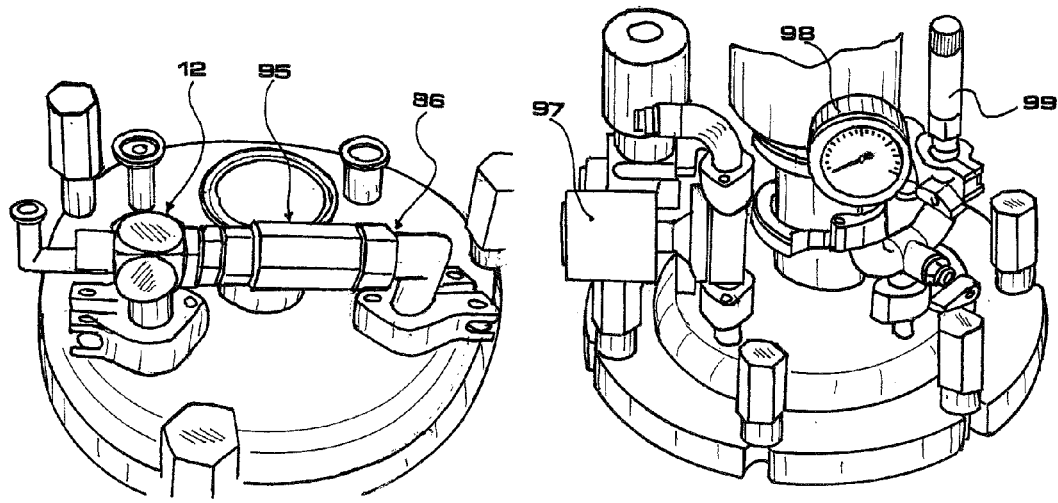
FIG.25  FIG.26
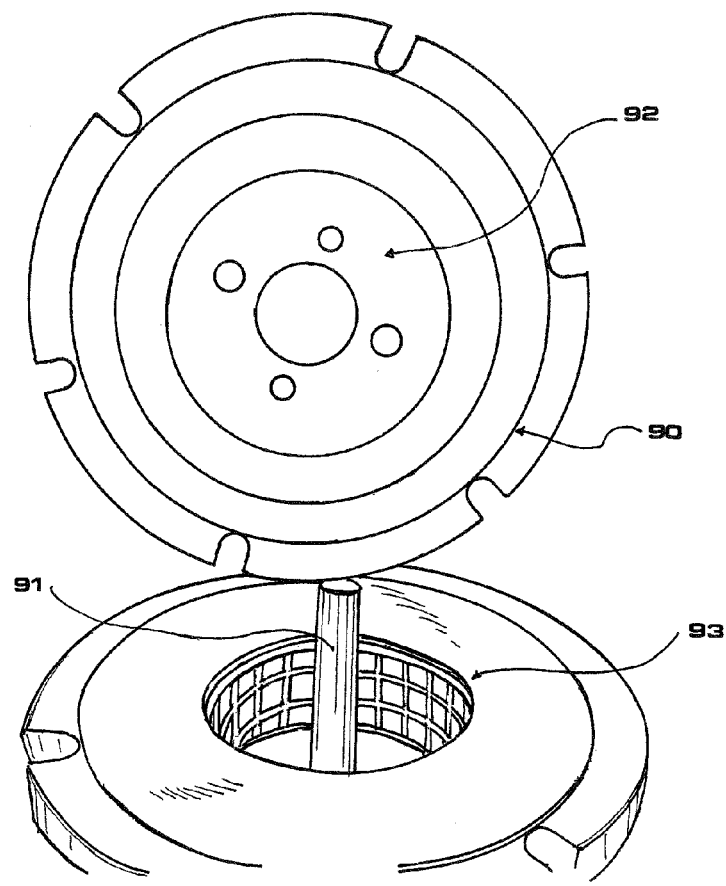
FIG.27A

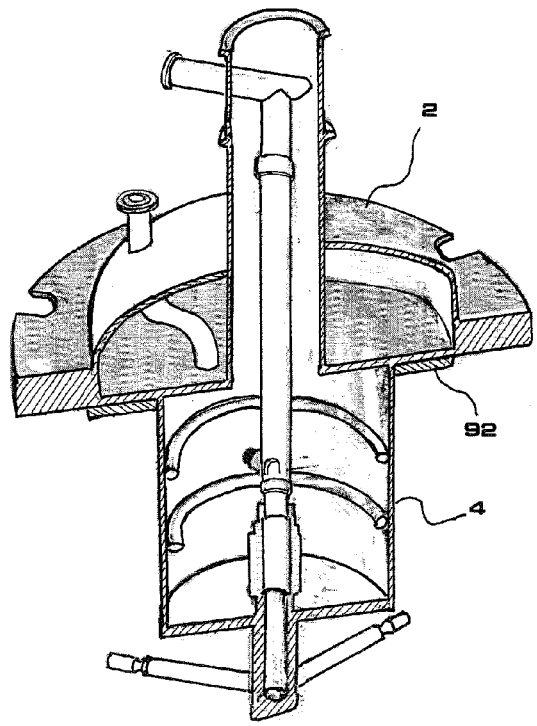
FIG.28
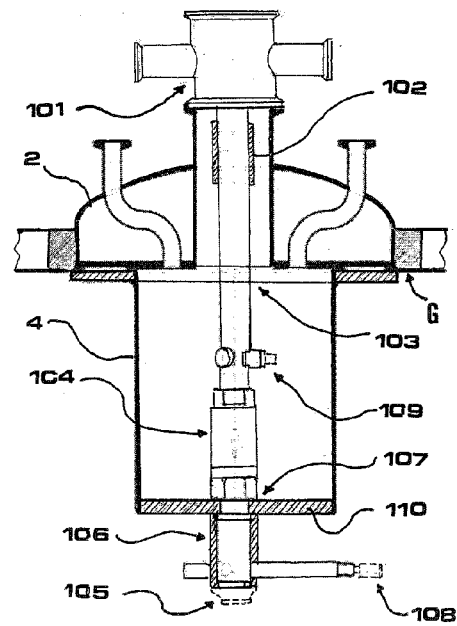
FIG.29
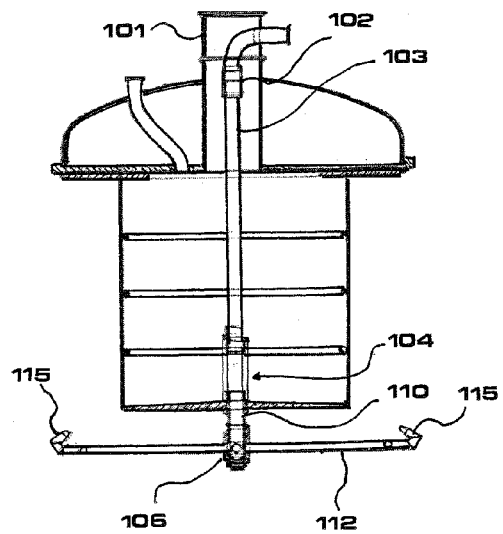
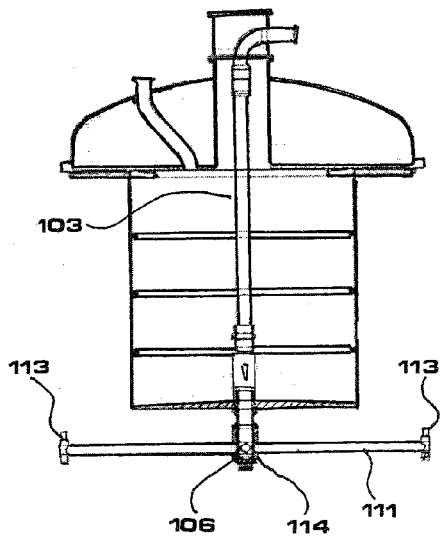
FIG.30

APPARATUS AND PROCESS FOR VACUUM CONVEYING OF POWDER PRODUCTS OR THE LIKE

CROSS REFERENCE TO RELATED APPLICATIONS

The present application is the US national stage entry of International Application PCT/IB2010/055526 filed on Dec. 1, 2010, which in turn claims priority to Italian Application RM2009A000656, filed on Dec. 14, 2009.

TECHNICAL FIELD

The present description relates to an apparatus for vacuum-assisted pneumatic conveying of powder products, granules or the like.

BACKGROUND

It is well known that these apparatus are used mainly within production departments for loading process machines such as: mixers, mills, driers, reactors, emulsifiers and metering devices, but also during handling operations for filing drums, bags, metal containers, big bags and finally in packaging departments for filing packaging machines, capsuling machines, tableting machines and metering machines.

These apparatus are silent, do not require maintenance and can be easily disassembled and washed.

In particular, the present invention relates to those apparatus intended essentially for applications in the chemical and pharmaceutical industries, where it is required to have a machine which can be easily cleaned and sterilized.

In commerce there exist already various companies which produce pneumatic conveyors which are more or less similar to each other, but none of these has the characteristic of being a machine which is totally pharmaceutical, where each single component may be easily disassembled, washed, dried and sterilized. In fact, only if all four of these steps can be performed, is it possible to speak of a pharmaceutical machine, while if only one of these steps is missing, the machine cannot be defined as such.

In order to satisfy these cleaning requirements, a modular machine consisting of individual components which can all be cleaned and sterilized has been devised.

SUMMARY

The object of the present invention is therefore to provide an innovative solution to the problems which are still unresolved in the prior art, by providing a conveying apparatus as defined in the independent claim 1.

The present invention also relates to a method for conveying powder products, as defined in claim 29.

Secondary characteristic features of the present invention are instead defined in the corresponding dependent claims.

BRIEF DESCRIPTION OF THE DRAWINGS

The present invention involves numerous advantages which, together with the characteristic features and methods of use of the present invention, will become clear from the following detailed description of embodiments thereof, provided by way of a non-limiting example, with reference to the figures of the accompanying drawings in which:

FIGS. 3 and 4 show a detail of the cover of the apparatus according to FIG. 1;

FIGS. 5 and 6 refer to the two main steps of a conveying process according to the present invention;

FIGS. 7A to 7E show a first embodiment of the filtering unit;

FIGS. 8A to 8D show a second embodiment of the filtering unit;

FIG. 11A to 11D show a detail of the filter holder plate;

FIGS. 12 to 17 refer to different methods of clamping together body and cover;

FIGS. 18 to 27B show the system of valves and pipes for implementing the conveying process; and FIGS. 28 and 32 refer to washing steps of the apparatus according to the present invention.

DETAILED DESCRIPTION

Figure 1:
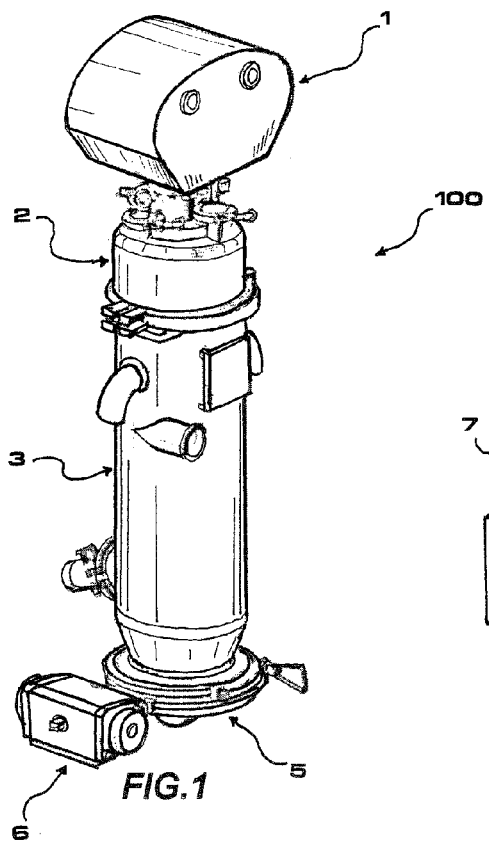
FIGS. 1 and 2 are views which show, overall, an apparatus according to the present invention.

The present invention will be described below in detail with reference to the abovementioned figures.

The apparatus according to the present invention comprises: a main body which has a container 3 and a cover 2; means 1, 10, 83 for introducing said product inside said container 3; means 5, 6 for discharging said product from said container 3; filtering means 4 for filtering said product.

Figure 2:
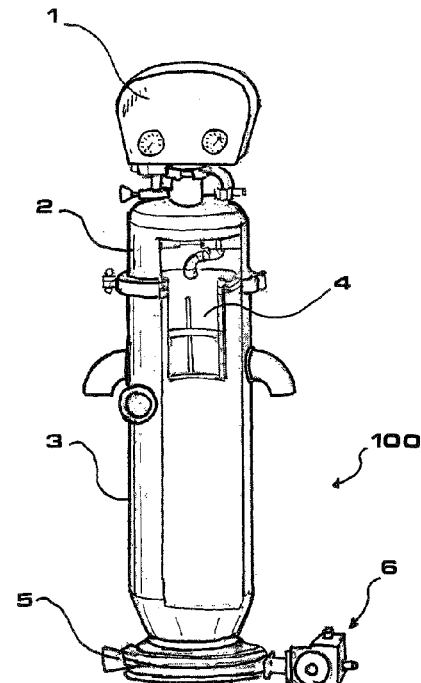

In the preferred embodiment, with reference to FIGS. 1 and 2, an apparatus according to the present invention comprises firstly a vacuum pump 1, a cover 2, a container machine body 3, a filtering unit 4, a discharge valve 5 and a control panel 7.

These parts, contrary to that envisaged hitherto by the prior art, are preferably connected together by quick-action coupling means of the clamp type, in order to facilitate the periodic cleaning operations, without the use of spanners or tools.

The machine is perfectly modular and, depending on needs, an apparatus suitable for the specific requirements may be assembled.

The discharge valve 5 is preferably of the sanitary butterfly type, with standard dimensions, ensuring a perfect vacuum and pressure tightness. Operation of the valve is performed preferably by means of a pneumatic actuator 6.

Alternatively a flange having a fixing hole according to the UNI standards may be provided for discharging.

Figure 3:
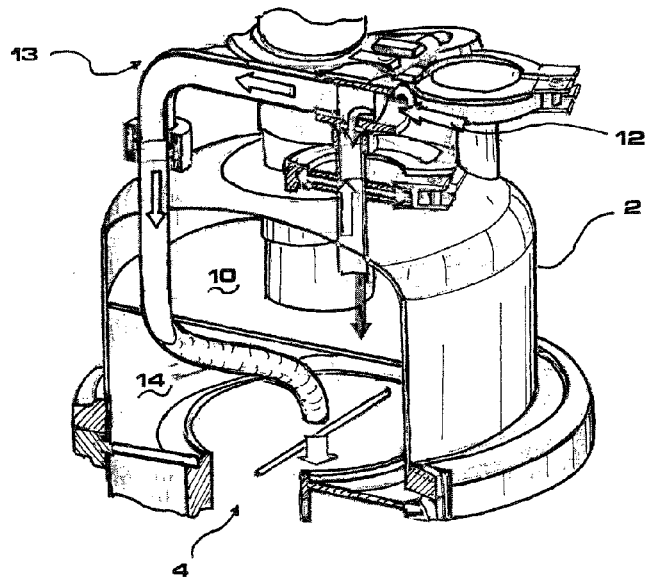
Figure 8B:
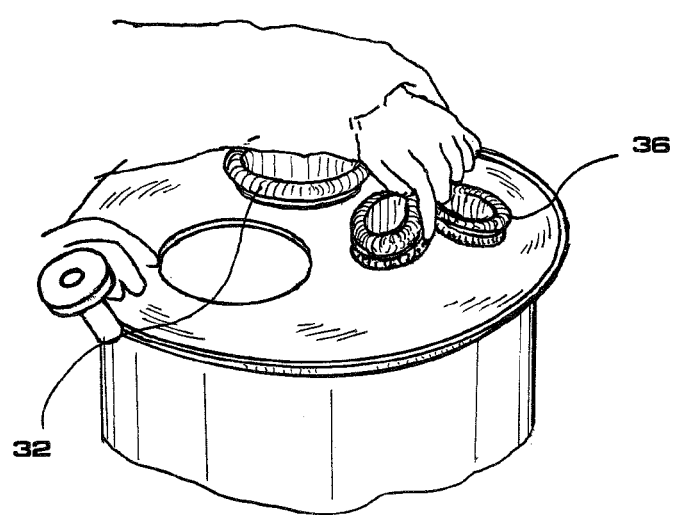
Figure 8C:
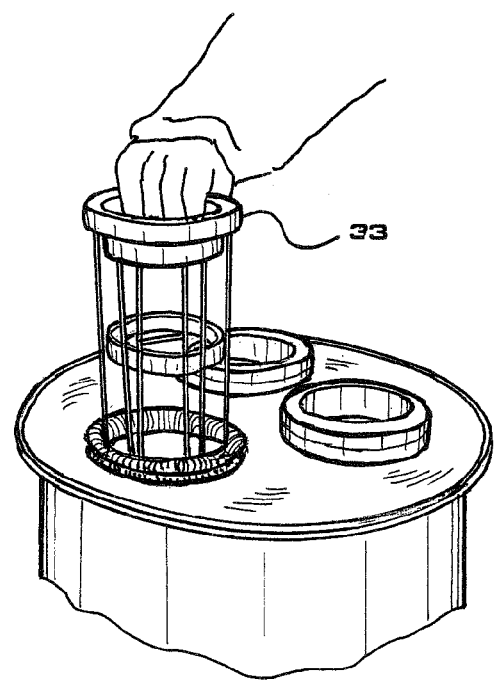
Figure 8D:
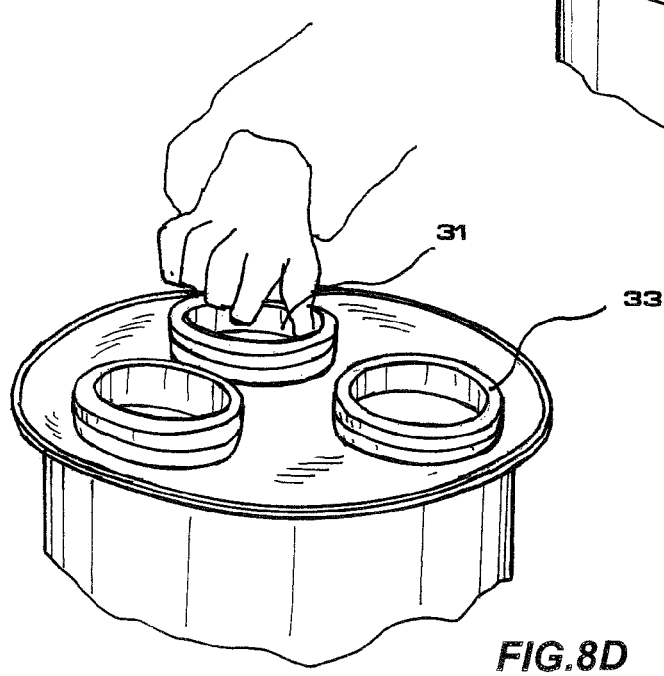
Figure 9A:
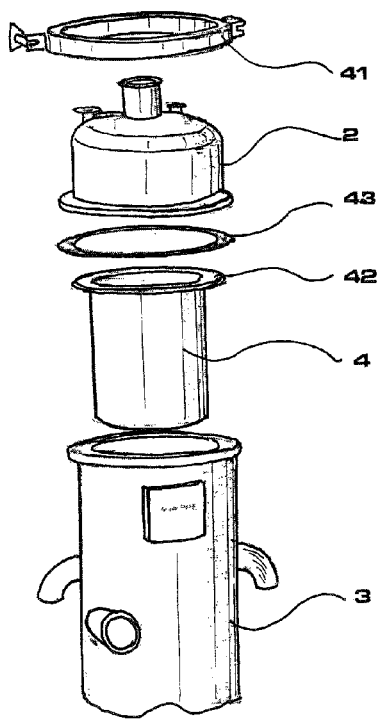
FIGS. 9A to 9D show a third embodiment of the filtering unit.
Figure 9B:
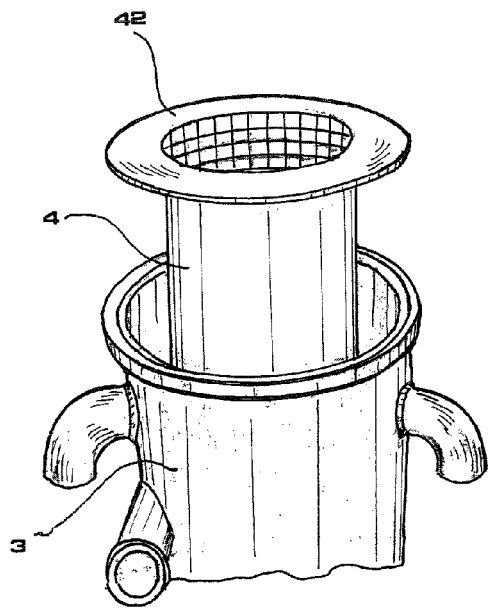
Figure 9C:
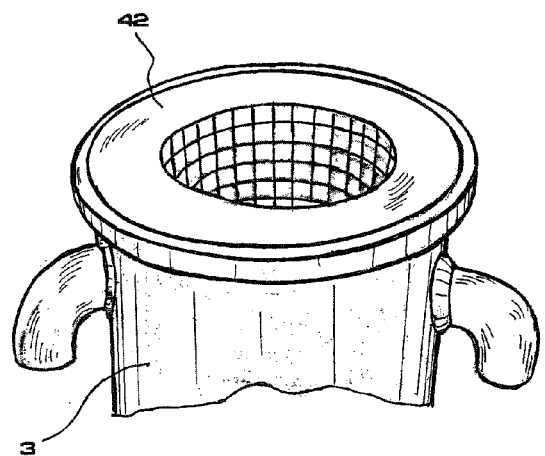
Figure 9D:
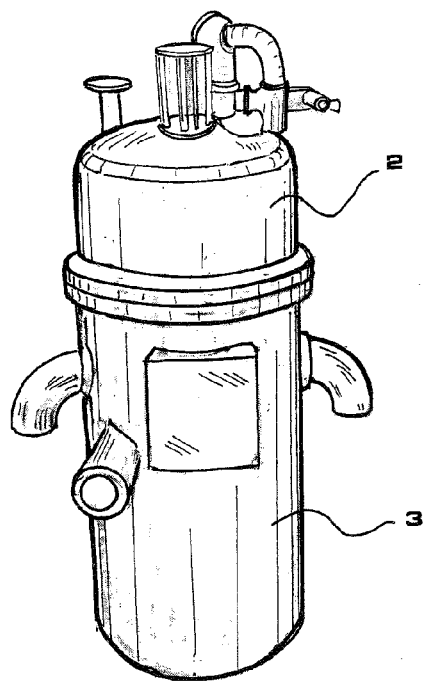
Figure 10A:
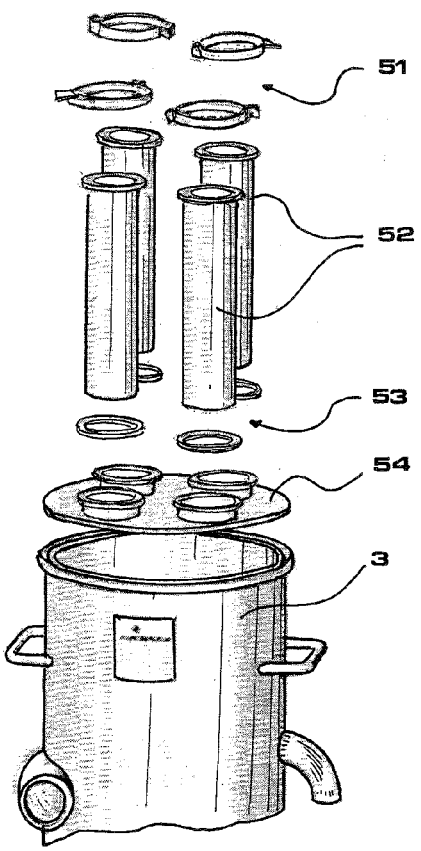
FIGS. 10A to 10D show a fourth embodiment of the filtering unit.
Figure 10B:
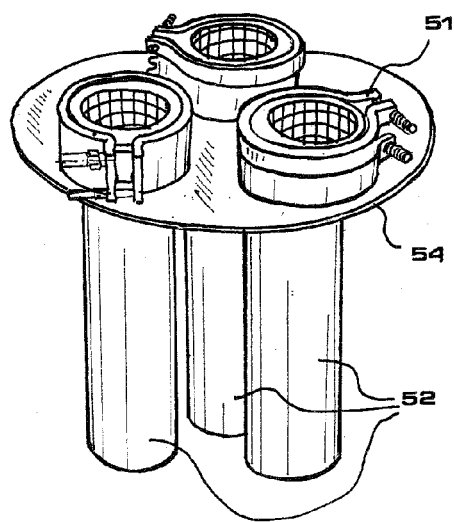
Figure 10C:
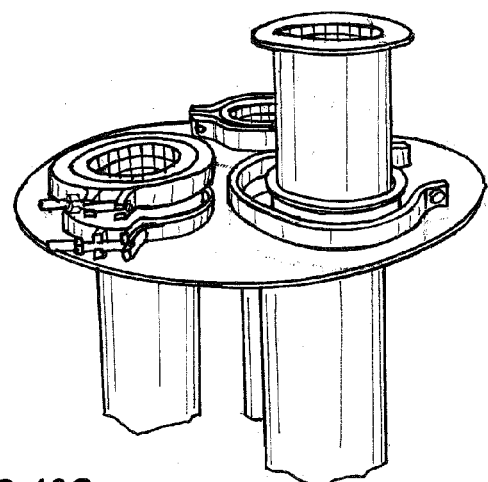
Figure 10D:
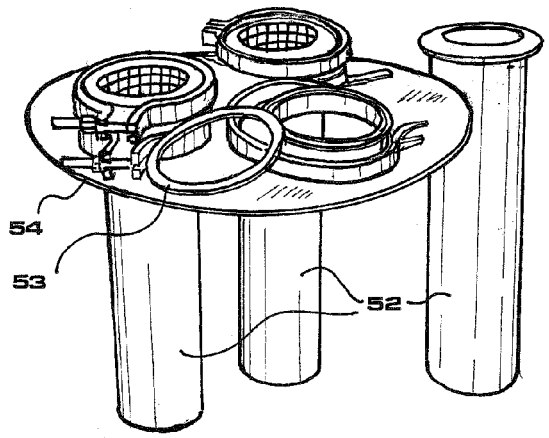
Figure 11A:
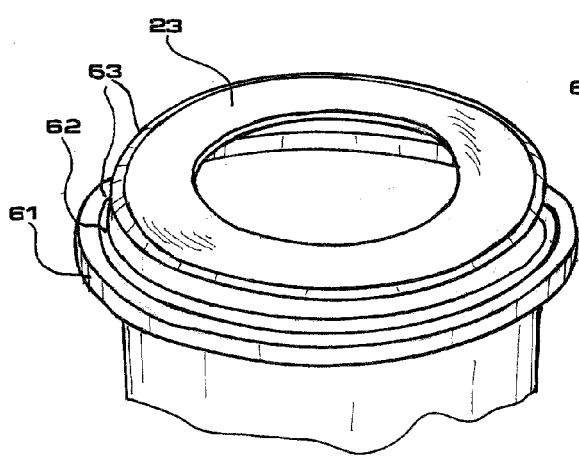
Figure 11B:
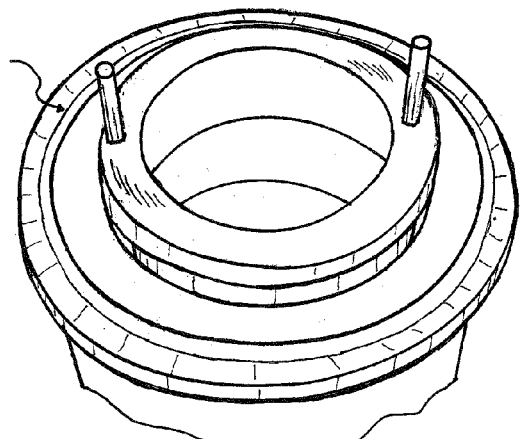

With reference to FIG. 3, of particular importance is the structure of the cover 2 which has, formed therein, a storage chamber 10 for air or nitrogen (or other gas or gas mixture) to be used during cleaning of the filtering unit 4.

Compared to the prior art, which envisages an external tank for performing cleaning of the filter by means of air backwashing, incorporation of the storage chamber 10 inside the cover results in a slimmer machine design and more immediate and efficient cleaning since there are no head losses.

FIGS. 3 and 4 show the storage chamber 10 which is filled via the quick-discharge valve 12 and then, via the outlet pipe 13 from the valve 12, discharges the air stored inside the chamber 10 and conveys it into the filter 4 through the nozzle 14.

The basic functions of an apparatus according to the present invention are as follows:

1) suction or loading of a product by means of a vacuum;
2) unloading of the product by means of opening of the discharge valve;
3) cleaning or backwashing of the filters during the unloading step.

Adjustment of the Product Suction Time

Adjustment of the product suction time is performed by means of the suction timing. For this purpose, first timing means T1, for example a first timer which can be set from 1 to 30 s, are advantageously provided.

The setting may be considered correct when the tank has been filled close to its maximum working capacity. Since the suction speed depends on the specific conditions of use, it is sometimes advisable to proceed stepwise.

Therefore, a short time may be set initially in order to prevent accidental clogging of the apparatus and then the level obtained checked. Then the operation may be repeated, increasing the suction time until the desired result is achieved.

The maximum filling level corresponds to the start of the suction pipe attachment.

Advantageously, timing of the loading step may envisage a delay in opening of the product inlet valve, with respect to operation of the vacuum pump, so as to achieve a greater vacuum inside the apparatus before suction of the product starts. This facilitates the conveying of powders which are moist and not very fluid and in particular helps break up any clogged zones which form along the pipe, in particular if it is long.

Adjustment of the Filter Cleaning Pressure

Means are also provided for adjusting the filter cleaning pressure, depending on the chemical/physical properties of the sucked product, within a range of 1 to 6 bar.

Adjustment of the Product Unloading Time

For the purpose of adjusting the product unloading time, second timing means, for example a second timer T2, which can be set from 1 to 30 s, are preferably provided.

The correct setting is obtained when complete emptying terminates just before closing of the valve. In this case also it is possible to proceed stepwise: firstly a time similar to or longer than required by suction is set and then it is checked whether emptying has occurred; then the operation is repeated increasing or decreasing the unloading time until the time required for complete emptying is obtained.

With reference to the following FIGS. 5 and 6, these illustrate in schematic form operation of an apparatus according to the present invention, with regard to its elementary and basic functions.

FIG. 5 relates to a loading step. The cycle starts with the discharge valve closed, the vacuum pump is operated and the powder is sucked using a special fluid pipe 7. The product is separated from the air by means of the filtering unit and then falls by means of gravity into the container 3.

FIG. 6 relates to an unloading step. When the loading step has been completed, the discharge valve 5 is opened and unloading of the product is performed. In order to facilitate outflow of the product, the apparatus according to the present invention may advantageously be equipped with a vibrator which, when operated, causes vibration of the machine body 3.

The apparatus according to the present invention comprises internally a filtering unit 4 which may be made in different ways and using different materials.

At the same time as the unloading step cleaning of the filtering unit by means of backwashing is performed. At the end of the pre-set unloading time T2, the bottom valve is closed and the loading cycle is started again.

The following FIGS. 7 to 11 show a number of possible embodiments of the filtering unit 4.

FIGS. 7A to 7E show a non-woven fabric filter.

Preferably the membraned antistatic epitropic polyester, PTFE, or other materials consisting of FDA-certified synthetic fibres, such as GORETEX®, etc., are used.

According to this first embodiment, the filtering unit comprises a PTFE membraned epitropic polyester sleeve 25 which adheres perfectly to a support disc 26 by means of a resilient snap-ring 28. The sleeve 25 is held in place and supported by a stainless steel basket 24 which is fastened to the cover 2. In order to ensure tightness during the suction step, a seal 23 which may be made of different elastomer materials is inserted between the body 3 and the cover 2.

FIGS. 8A to 8D show a non-woven fabric filter.

Preferably the membraned antistatic epitropic polyester, PTFE, or other materials consisting of FDA-certified synthetic fibres, such as GORETEX®, etc., are used.

In the case of apparatus where the nominal diameter of the machine body is greater than 300 mm, several sleeves 34 are used as a filtering unit 4.

In this case the filtering sleeves 34 are inserted into the support disc 35 by means of respective resilient snap-rings 36. Each sleeve 34 is held in place and supported by a respective stainless steel basket 33 which is fastened by means of a corresponding disc 32 and then clamped in position by means of a pommel or a nut 31.

FIGS. 9A to 9D show a filter made AISI 316L stainless steel or titanium sintered mesh.

A further variant consists of a filter 4 made of stainless steel or titanium sintered mesh welded to a support disc 42, forming one piece therewith. In order to ensure tightness during the suction step, a seal 43, which may be made of different elastomer materials according to the applicational requirements, is inserted between the body 3 and the cover 2.

FIGS. 10A to 10D show a set of stainless steel or titanium sintered mesh filters.

Here too, in the case of apparatus where the nominal diameter of the machine body is greater than 300 mm, advantageously several stainless steel or titanium cartridges, for example a set of four filters, as shown in the figures, may be used. In this case the filtering cartridges 52 are inserted in a support disc 54 and are fastened by means of clamp-type fasteners 51. The tightness of the disc is ensured by respective seals 53.

The following FIGS. 11A to 11D refer to a detail of the filter-holder plate already previously indicated by the number 23.

One of the particular features of the apparatus according to the present invention consists in the system for coupling the filter-holder plate 23 to the container machine body 3. The plate 23 rests inside a seat 62 formed inside the end flange 61 of the body 3 of the apparatus. Both the end flange 61 and the filter-holder plate 23 have a multiple-rib knurling 63 such that, when the plate is inserted into the seat 62, the respective knurlings form a peripheral portion ensuring improved tightness with respect to the cover 2.

The type of clamp flange, provided according to a particular design, results in an optimum vacuum and pressure tightness (−1 to +6 bar). The versatility of the coupling system is such that stainless steel filters may also be used.

Other drawbacks are due to the type of disc filter already used by the prior art. Of these, the main drawback is that the filtering area is insufficient in cases where high flowrates are required.

In this connection a brief example is provided by referring to the formula used to calculate, according to the present invention, the filtering area:

$$Q = V \times S$$

where:

Q=air flowrate required for conveying, expressed in m³/min

V=filtering speed expressed in m/min

S=filtering speed expressed in m²

The literature on the subject of the dimensions of the filtering baffles indicates, in the case of cloth filters, 1.2 m/min. as the maximum throughflow speed for continuously operating cyclones (for example dedusting filters) and 5-10 m/min. for discontinuously operating cyclones (for example vacuum conveyors), while, in the case of stainless steel filters, a speed of 15 m/min., which may reach a value of up to 25 m/min. in the case of titanium filters, is indicated.

The Table below shows an example of a calculation performed for an apparatus with a diameter of 200 mm, the hourly throughput of which is equal to 1000 kg/h.

Clamping together of the body 3 and the cover 2 is performed preferably by means of a clamp-type fastening with a clamping band 71.

In particular the clamping band 71 may take the following forms:

A) Thickness 2 mm, with single open-type wing nut 72, used preferably in applications where there is no pressure;

B) Thickness 3 mm, with single closed-type wing nut 74, for applications which require a greater sealing action against fine powders and an overpressure of up to 0.4 bar;

B) Thickness 4 mm, with double wing nut 75 of the closed type 77, for applications which require a PN3 pressure-tightness class (PED applications). In order to ensure correct

| Initial calculation data for AGR200 | | | | Ref. under press/suction conditions | |
|---|---|---|---|---|---|
| DESCRIPTION | | | | S.I. CONVERSION | |
| MATERIAL DATA | SYMBOL | VALUE | UNITS | VALUE | UNITS |
| PLANT LINE REF. | | | | | |
| MATERIAL TO BE CONVEYED | Pharm. Product | | | | |
| SPECIFIC WEIGHT MATERIAL | gsp.mat. = | 0.5 | kg/dm^3 | 500 | kg/m^3 |
| POTENTIAL CONVEYING CAPACITY | p = | 1000 | kg/h | 1 | T/h |
| SET LINE PIPE DIAMETER | dimp. = | 50 | mm | 0.05 | mt |
| CYCLONE CHARACTERISTIC INDEX | z = | 10 | adim.l | | |
| AIR PROPULSION MEANS DATA | | | | | |
| SPECIFIC WEIGHT AIR | gsp.air = | 1.205 | kg/dm^3 | 1205 | kg/m^3 |
| ALTIMETRIC HEIGHT | a.s.l. = | 257 | mt | 0.257 | km |
| AMBIENT TEMPERATURE | T = | 20 | °C. | 293 | °Kelvin |
| RELATIVE HUMIDITY | U = | 40 | % | | |
| CYCLONE ENTRY HEIGHT FROM LEV. ± 0.00 | H = | 1000 | mm | 1 | mt |
| Calculation results | | | | Ref. under press./suction conditions S.I. CONVERSION | |
| DESCRIZIONE | SYMBOL | VALUE | UNITS | VALUE | UNITS |
| PRODUCT THROUGHPUT | Q = | 0.278 | kg/sec | | |
| LITERS AIR | la = | 55 | lt. | | / |
| VOLUME WORKING AIR FOR CONVEYING | Varia = | 0.0153 | m^3/Sec | 55 | m^3/h |
| SPEED WORKING AIR FOR CONVEYING | varia = | 16.97 | m/sec | | / |
| DIAMETER 1ST APPROX.TN LINE | d 1° app.- | 0.034 | mt | 33.81 | mm |
| APPROX.TN TO COMM.L STANDARD DIAMETER | dstand. = | 0.034 | mt | 34.0 | mm |
| RECALC. WORKNG AIR SPEED FOR CONVEYING | V ri-calc = | 16.83 | m/sec | 17.00 | Arr.ta |
| MINIMUM DIAMETER CYCLONE SPEED | D = | 0.100 | mt | 100.26 | mm |
| CONVEYOR DIAMETER | D = | 0.200 | mt | 200.00 | mm |
| DYNAMIC PRESSURE IN CYCLONE | pd = | 1674 | mmH2O | | |
| HEAD LOSS IN CYCLONE | h6A= | 695.62 | kg/m^2 | 0.1 | bar |
| MINIMUM SEPARATION DIAMETER | dmin = | 0.3854 | mm | | |
| HEAD LOSS CYCLONE INLET | h4M = | 18.18 | kg/m^2 | 0.0018 | bar |
| CENTRIFUGAL SEPARATION FORCE | Fc = | 1443.2 | kg | | |
| AIR ELASTICITY CONSTANT | R = | 29.30 | m/°K | | |
| RADIAL SPEED AIR INSIDE CYCLONE | vri (1) = | 0.0770 | m/sec | | |
| RADIAL SPEED AIR INSIDE CYCLONE | vri (2) = | 0.0383 | m/sec | | |
| FILTRATION SPEED cloth filters | vF = | 5 | mAnin | | |
| Min. filtration area cloth filters | $S_{M}Filter$ = | 0.18 | m² | | |
| FILTRATION SPEED stainless steel filters | | 15 | | | |
| Min. filtration area stainless steel filters | $S_{M}Filter$ = | 0.06 | m² | | |
| FILTRATION SPEED titanium filters | | 25 | | | |
| Min. filtration area titanium filters | $S_{M}Filter$ = | 0.04 | m² | | |

If this formula is applied to the filtering baffle of the disc type (as envisaged in the prior art), a filtering area of 0.03 m² for an apparatus with a diameter of 200 would be obtained, against a minimum of 0.18 m² which is equivalent to a speed of 30 m/min., i.e. a condition which is not advantageous in any way.

With reference now to FIGS. 12 to 17, a number of possible ways of clamping together the body 3 and cover 2 are described.

tightening of the wing nut a spanner grip 76 is preferably provided so as to be able to tighten the wing nut using also a torque wrench.

Alternatively, tightening may be performed using wing nuts operating directly on the flanges of the cover 2 and the machine body 3, for a greater pressure tightness.

Figure 16:
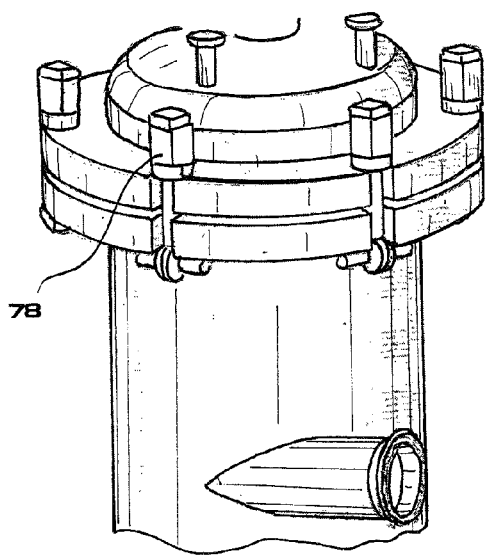
Figure 17:
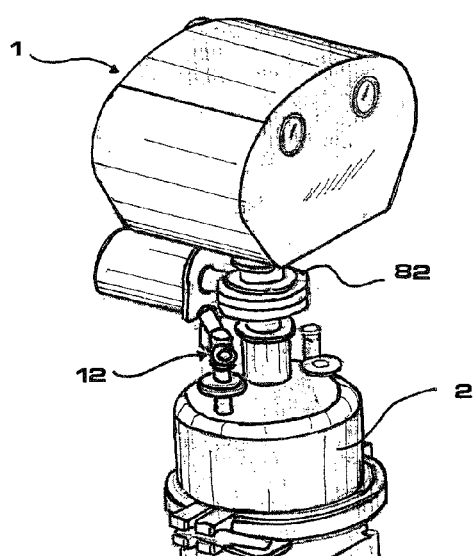
Figure 18:
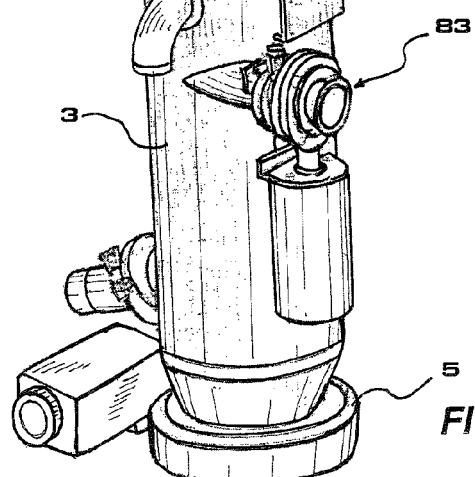
Figure 19:
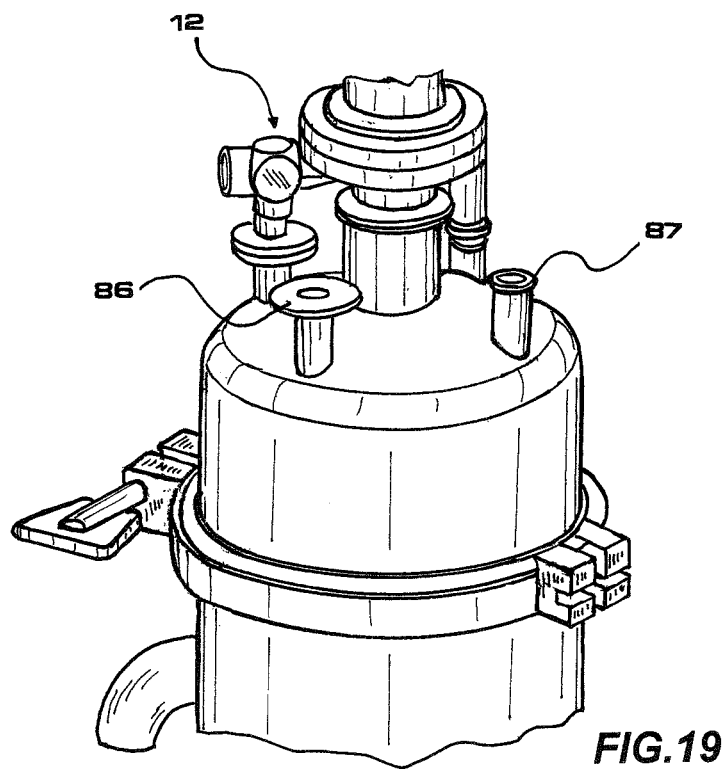

As can be seen in FIGS. 16 and 17, both the body 3 and the cover 2 are made with flanges of thickness (class PN6) on which the inserts and the connections for fixing the tightening wing nuts 78 are then formed. This particular type of clamping system, which is not commercially available in other types of powder conveying systems, allows a tightening torque to be achieved so as to ensure a high-pressure seal (class PN6).

The above description has highlighted only some of the special features of an apparatus according to the present invention, said features consisting in the special type of structure, design of the clamping system in the form of clamp-type quick-action coupling means, incorporation of a tank inside the cover, provision of a filter-holder plate suitable for different types of material and configuration, provision of a clamping flange between the body and the cover with a knurling which ensures an optimum vacuum and pressure tightness, provision of a clamp-type fastening which can be configured in different thicknesses and with a different type of closure depending on the different applications and desired pressure-tightness classes, and provision of a tightening system using wing nuts suitable for seals at high pressures of up to 6 bar.

However, the apparatus according to the present invention envisages further innovative technical and functional features which will become evident during the course of the description.

In particular, the present invention also envisages an innovation as regards operation of the apparatus and thus a process for pneumatic conveying of powder material or granules.

Therefore different operating modes are envisaged:

Mode with product unloading under overpressure;

Mode with product unloading performed with inerted chamber and under overpressure;

The overpressure condition is advantageous in two cases:

1) where there are products which are particularly dense, moist, abrasive or very light and which cannot be conveyed or in any case are difficult to convey using normal conveyors; in this case it is useful to have during unloading a slight overpressure which helps downward conveying of the product which otherwise would remain within the container body of the apparatus;

2) when there are reactors filled with solvent or hot water; in this case the pressurized vapours rise upwards and envelop the bottom valve, causing obstructions and blockages. An overpressure during unloading frees the bottom valve and allows unloading of the product without the solvent or water vapour entering inside the chamber of the apparatus;

3) when there are reactors operating with breathing and under a slight overpressure; in this case, during unloading, the reactor pressure must be overcome, always and in any case within the limit of 0.5 bar max.

The process according to the present invention is as follows:

Initially the vacuum pump 1, the valve 82 on the cover 2 and the product inlet valve 83 are operated and the storage chamber 10 is filled with air/nitrogen via the quick-discharge valve 12. The bottom valve 5 instead remains closed.

After a set loading time, the loading step terminates and, before starting the unloading step, the valve 82 on the cover and the inlet valve 83 are closed. Air/nitrogen is introduced into the chamber of the apparatus via the inlet 86, while from the inlet 87 the air/nitrogen enters the control panel where means M for controlling and adjusting the pressure inside said container 3 read the pressure thereof. Said means M, in the preferred embodiment of the invention, consist of a manostat M (see FIG. 20).

The manostat M has a pressure read-off value which can be set from 0.1 to 0.45 bar, so that the operator is able to set manually the desired pressure value which is to be reached inside the chamber of the apparatus.

Adjustment of the manostat M must be performed using a screwdriver to turn the screw one revolution at a time and checking during the working cycle the pressure reached inside the apparatus and shown on the panel pressure gauge PI.

When the value set on the manostat M is reached, the pneumatic valve which introduces air/nitrogen into the apparatus via the inlet 86 is closed and the bottom valve 5 is opened.

The product then descends under overpressure, overcoming any related resistance which it may encounter.

A few seconds after the bottom valve has been opened, the filters are backwashed by means of opening of the quick-discharge valve 12.

The particular feature compared to the prior art is that, during unloading, the pneumatic valve which introduces air/nitrogen inside the chamber of the apparatus via the inlet 86 is closed, and therefore no gas is introduced during this step. This prevents the machines which are loaded by means of the apparatus from becoming pressurized or in any case being affected by dedusting problems due to the excessive amount of nitrogen/air which is introduced with the product during unloading.

The overpressure step according to the present invention envisages an actual breathing action within the container body of the apparatus and, during unloading, there will be quantities of gas/product which are discharged and the gas compressed inside the chamber acts as a conveying vehicle, imparting to the product a force able to overcome the inertial reaction of the product.

In effect, by compressing a gas inside a chamber, the pneumatic resistance of the compressed gas is used to reduce precisely the inertial reaction.

The prior art instead envisages an overpressure, which can be set between 0.5 and 5 bar and which is constant during the entire unloading step, creating a whole series of drawbacks:

1) excessive gas consumption during unloading;

2) impossibility of having air as a breathing/overpressure gas;

3) if the value of the overpressure is high, greater than 3-4 bar, then efficient cleaning of the filtering baffle is performed, but not in all machines is it possible to perform unloading at that pressure value, except in machines which are PED-certified and in any case provided with a conveyed discharge value which evacuates the nitrogen introduced;

4) if the value is low, i.e. between 0.5 and 1 bar, precisely in order to avoid the drawback mentioned in point 3, cleaning of the filtering baffle is insufficient, so that after various operating cycles the machine will start to suffer from a reduction in throughput until it no longer performs suction or at least operates very inefficiently.

In applications performed in environments containing explosive mixtures, a working cycle may be used where the container body of the apparatus is inerted before unloading of the product. The inerting step is able to eliminate from the container all the oxygen or at least ensure that the remaining amount of oxygen is such as not to trigger explosions with explosive powders.

In this case, the process according to the present invention envisages operating initially the vacuum pump 1, the valve on the cover 82 and the product inlet valve 83, and the air/nitrogen chamber 10 is filled via the quick-discharge valve 12. The discharge valve 5 is closed.

Figure 20:
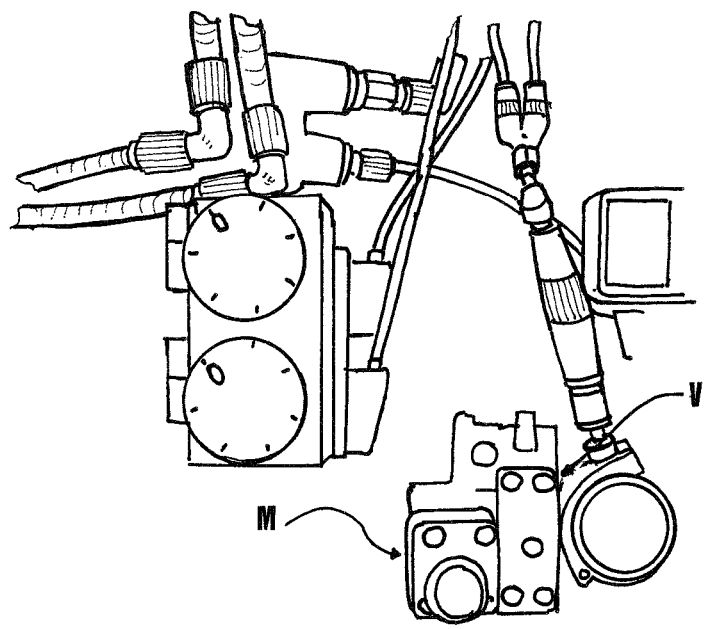

After a set loading time, the loading step terminates and, before starting the unloading step, the product intake valve 83 is closed, while the vacuum valve 82 remains open in order to complete extraction of air from the container body 3 until the set vacuum value is reached, said value being transmitted via the inlet 87 to means V for checking and adjusting the internal pressure of said container 3, which means, in the preferred embodiment of the invention, comprise a vacuostat V located on a control panel (visible in FIG. 20).

The vacuostat allows adjustment of the vacuum from −5 to −95 kPa so that the operator may choose the vacuum value depending on the actual requirements for the amount of oxygen remaining inside the apparatus chamber. Adjustment of the vacuostat V may be performed by turning the screw one revolution at a time using a screwdriver and checking during the working cycle the vacuum present inside the apparatus and shown on vacuum meter.

For example, if there is a need to have an oxygen value less than 3%, the vacuostat is set to −90 kPa so that only 10% air, containing 2.1% oxygen, will be left inside the chamber.

When the air extraction step has been completed, the vacuum valve 82 is closed, the pneumatic valve which is on the control panel is opened and nitrogen is introduced into the apparatus via the inlet 86, while the nitrogen flows from the inlet 87 into the control panel where the manostat M reads its pressure. The manostat has a pressure read-off value variable from 0.1 to 0.45 bar, so that the operator is able to set manually the desired pressure value which is to be reached inside the chamber of the apparatus. Adjustment of the manostat M may be performed by turning the screw one revolution at a time using a screwdriver and checking during the working cycle the pressure reached inside the apparatus and shown on the control panel pressure gauge.

When the value set on the manostat M is reached, the pneumatic valve which introduces nitrogen into the apparatus via the inlet 86 is closed and the bottom valve 5 is opened, thus starting the unloading step. The product then descends under overpressure, overcoming any related resistance which it may encounter. A few seconds after the discharge valve has been opened, the filters are cleaned by means of backwashing with opening of the quick-discharge valve 12.

Figure 21A:
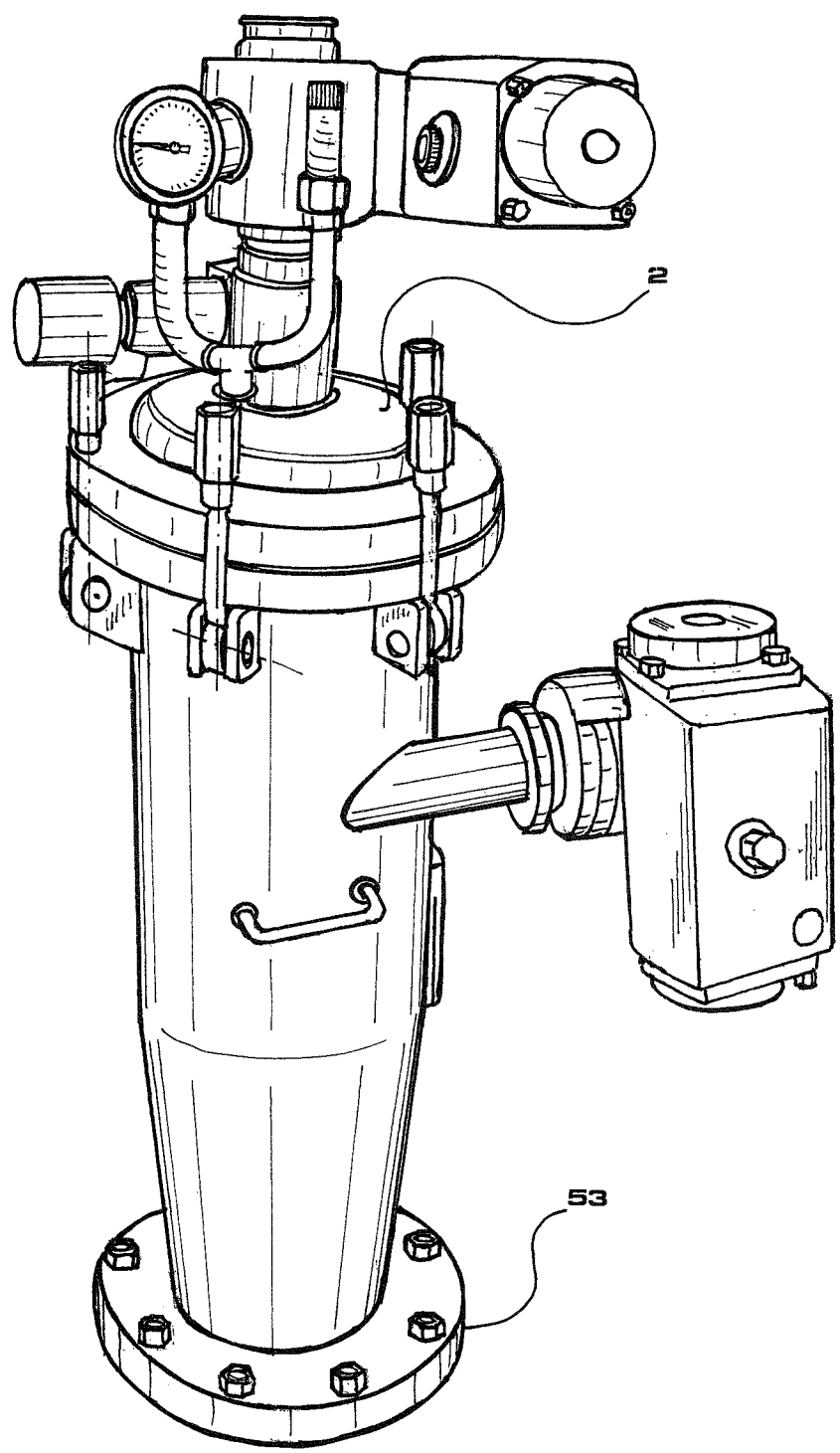
Figure 21B:
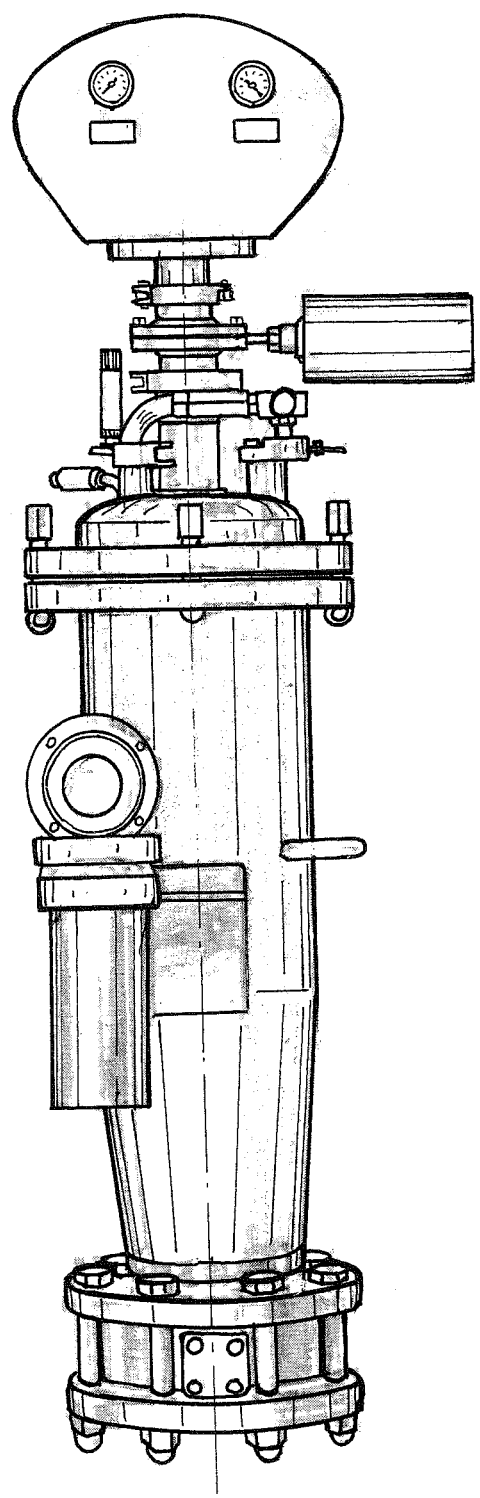
Figure 22:
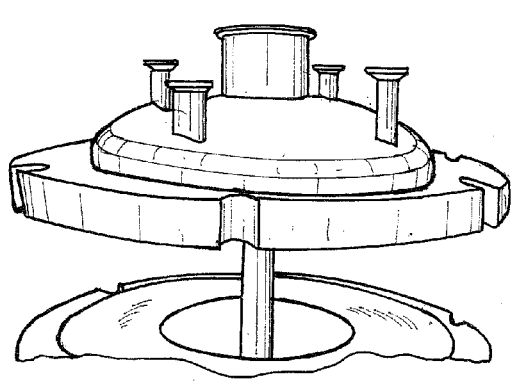

An apparatus according to the present invention may be realized, with the same modes of operation described hitherto, in a PED-classified design. Such a design will obviously have to envisage an inlet valve 1 on the cover 82 and a discharge valve 5, which are PED classified. FIG. 21B shows, overall, an apparatus according to the present invention, with a PED design.

According to the present invention, the cover envisages, preferably, four inlets, each of which is intercepted by a corresponding valve, so as to ensure pressure tightness.

Figure 23:
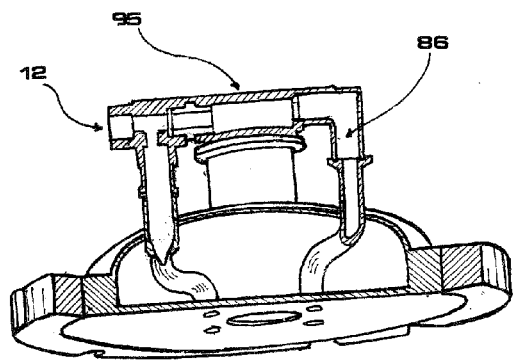
Figure 24:
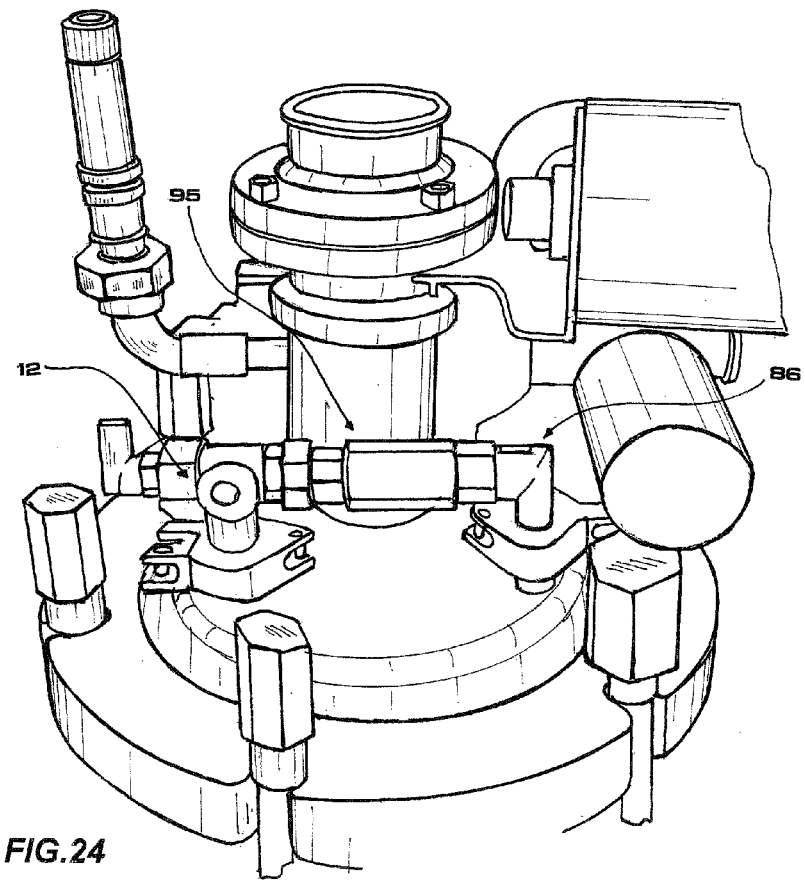

The quick-discharge valve assembly 12 has a non-return valve 95 at its outlet so that pressure is unable to rise back up from the pipe 86, as can be seen in FIGS. 23, 24 and 25.

FIG. 26 shows a diaphragm valve 97 located at the overpressure inlet, a vacuum pressure gauge 98 and a safety valve 99, located on the vacuum/pressure signal inlet.

The following FIG. 27A shows the particular design of the base plate 92 of the cover 2, which is required to obtain the gas storage tank 10.

This plate 92 is completely welded flush with the flange so as to be able to allow more secure clamping together of the body 3 and cover 2 and also so as to prevent, during the washing steps (a detailed description of which will be given below), the washing liquid from being able to stagnate above the filter, as occurs in the apparatus with a non-PED design according to the prior art. When the cover 90 is closed, in fact, the chamber of the filter 91 is in contact with the plate 92 which penetrates slightly inside the same, creating, together with a seal 93, a single body and thereby preventing the formation of stagnation points following washing.

Figure 27B:
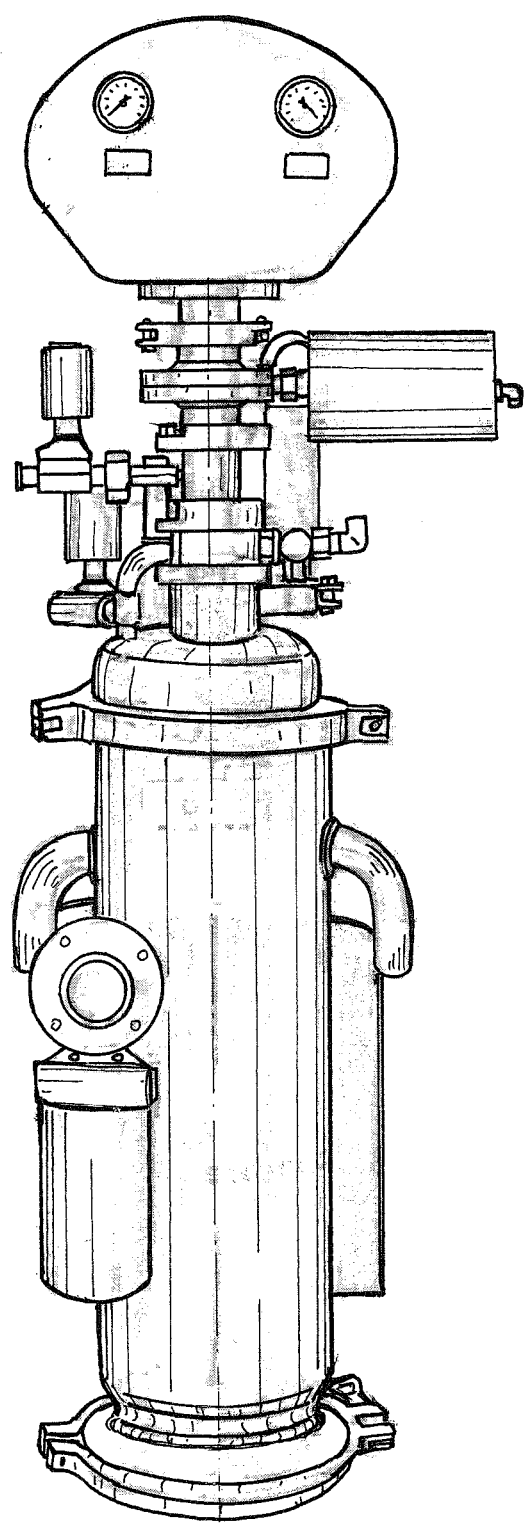

The apparatus according to the present invention has washing means and may, therefore, be washed and dried on-site in accordance with the operating steps commonly referred to as C.I.P. (Cleaning in Place) steps. FIG. 27B shows, specifically, an apparatus according to the present invention, with a C.I.P. design.

In commerce there exist solutions with rotary heads or where the container of the apparatus is flooded by the same vacuum, but these are what are commonly called W.I.P. (Washing in Place) operations, which, however, envisage only washing of the surfaces and not drying, so that it is required in any case to disassemble the machine and perform drying of all the metal parts and the filter.

Figure 31:
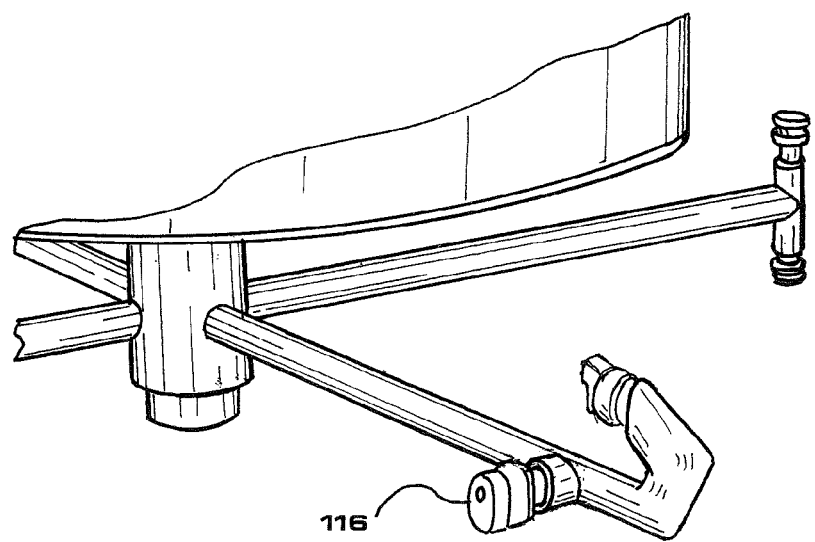
Figure 32:
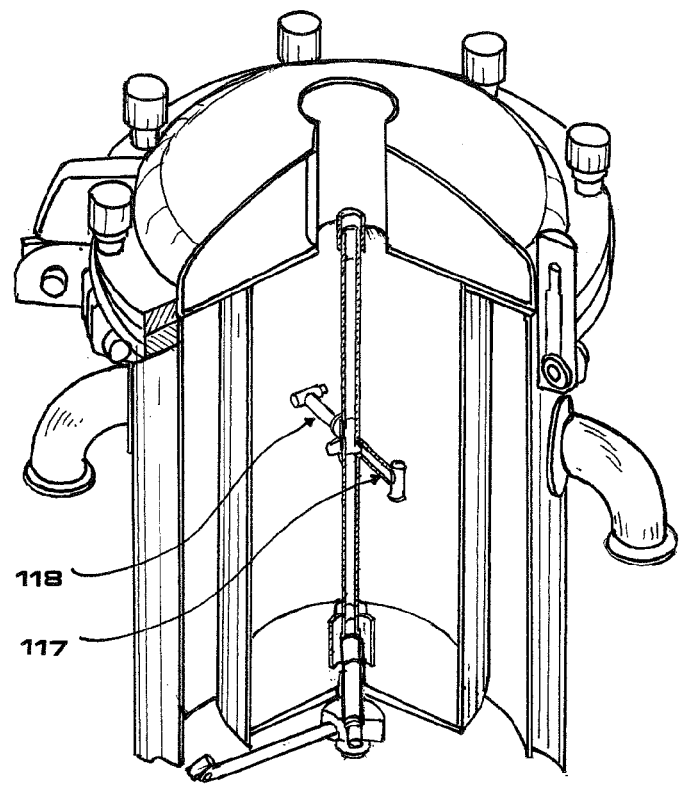

The washing system with which the apparatus according to the present invention is equipped may be formed by:

1) Fixed arms with rotary heads, as visible in FIGS. 28 and 29;

2) Rotating arms with washing nozzles, as visible in FIGS. 30, 31 and 32.

FIGS. 28 and 29 show the assembly composed of the washing system together with the filter 4, cover 32 and a seal G.

The internal washing means comprises a system for distributing the washing liquid which has at least one rotary head with one or more nozzles 108, 113, 115, 116. The rotary head is positioned outside the filtering unit 4 with nozzles directed so as to be able to wash an outer wall of the filtering unit 4.

The filter 4 is preferably made of stainless steel with a sintered mesh having a filtration fineness of 0.5 to 10 microns. The base 100 of the filter has a central hole which allows an arm support tube 106 to be connected to the distribution pipe 103. In order to prevent the powder from being able to return through the rotary heads 108, a check valve 104 is arranged between the pipe 103 and the arm support tube 106.

The whole assembly is fastened together by means of a closing cap 105. The pipe 103 may be provided with two or three nozzles 109 (or two or three variable-diameter holes) for flooding the internal chamber. The liquid enters via a distribution connector 101 which may have one or two inlets and which is engaged onto the pipe 103 via a sleeve 102 which has an O-ring inside. With this system the entire surface of the filter and the inside of the container chamber of the apparatus are washed.

In FIG. 30, unlike that described above, the distribution connector 101 is formed with a single inlet. The sleeve 102 engages over the pipe 103 and via the check valve 104 is connected to the arm support tube 106 which, in this case, is rotatably mounted; in fact the latter is separated from the pin 110 by a spacer 114 so that the O-rings, which are made of rigid PTFE, are able to allow movement without offering any resistance.

The tube 106 has, mounted thereon, preferably four arms, two denoted by the number 111 with upwardly facing nozzles 113 performing washing at 120° and two, denoted by 112, with nozzles 115 inclined towards the filter and performing washing at 90°.

FIG. 31 shows a variant of this configuration in which one or more arms also have a horizontally arranged nozzle 116 which ensures the movement of the arm assembly owing to the water pressure.

FIG. 32 shows a further variant in which the filter also has internally two arms, one with vertical nozzles 118 and the other one with horizontal nozzles 117.

The present invention has been described hitherto with reference to preferred embodiments thereof. It is understood that other embodiments relating to the same inventive idea may exist, all of these falling within the scope of protection of the claims which are provided hereinbelow.

The invention claimed is:

1. A pneumatic conveying apparatus for pneumatic conveying of a powder product or the like, comprising:
    a main body having a container and a cover which are connected together by means of quick-action coupling means;
    means for introducing said product into said container;
    means for discharging said product from said container;
    means for controlling and adjusting the pressure inside said container;
    filtering means for filtering said product, comprising at least one filtering unit;
    washing means internal to said container; and
    filter coupling means for coupling together said filtering means and said main body;
wherein said washing means internal to said container comprises a system for distributing the washing liquid, which has at least one rotary head with one or more nozzles, said rotary head being outside said filtering unit and said nozzles being directed so as to wash an external wall of said filtering unit and said filter coupling means comprises a multiple-rib knurling.

2. The pneumatic conveying apparatus according to claim 1, wherein said quick-action coupling means are of the clamp type.

3. The pneumatic conveying apparatus according to claim 1, wherein said means for introducing said product inside said container comprise a vacuum pump and a product inlet valve.

4. The pneumatic conveying apparatus according to claim 1, wherein said means for discharging said product from said main container comprise a pneumatic discharge valve.

5. The pneumatic conveying apparatus according to claim 4, wherein said pneumatic valve comprises a discharge valve and a pneumatic actuator.

6. The pneumatic conveying apparatus according to claim 1, wherein said system for distributing the washing liquid comprises a distribution pipe connected to an arm support tube, wherein said arm support tube has, mounted thereon, four arms with said nozzles inclined towards said filtering unit and performing washing at 90°, and upwardly directed nozzles performing washing at 120°.

7. The pneumatic conveying apparatus according to claim 6, wherein at least one of said arms comprises a horizontally arranged nozzle.

8. The pneumatic conveying apparatus according to claim 6, further comprising at least two arms mounted inside the filter, one of which with a horizontally arranged nozzle and another one with a vertically arranged nozzle.

9. The pneumatic conveying apparatus according to claim 1, wherein said means for controlling and adjusting the pressure inside said main container comprise a manostat and a vacuostat.

10. The pneumatic conveying apparatus according to claim 1, further comprising a chamber for storing air or nitrogen or other gas or gas mixture, formed in said cover and able to contain said gases so as to introduce then into said main body during an operation step, via a quick-discharge valve.

11. A process for vacuum-assisted pneumatic conveying of powder products or the like by means of a pneumatic conveying apparatus, comprising:
    loading said products into a container body of said apparatus,
    inerting or unloading said products via an inerted chamber and under overpressure, and
    backwashing a filtering unit of said apparatus,
wherein said unloading comprises a breathing suitable for achieving an overpressure of said container of between 0.1 and 0.45 bar and said inerting comprises:
    operating said vacuum pump,
    filling of said storage chamber with air/nitrogen or other gas, and
    closing of said discharge valve,
wherein said vacuostat allows setting of the residual amount of said gases remaining in said storage chamber, and wherein said pneumatic conveying apparatus comprises:
    a main body having a container and a cover which are connected together by means of quick-action coupling means;
    means for introducing said product into said container;
    means for discharging said product from said container;
    means for controlling and adjusting the pressure inside said container;
    filtering means for filtering said product, comprising at least one filtering unit; and
    washing means internal to said container;
wherein said washing means internal to said container comprises a system for distributing the washing liquid, which has at least one rotary head with one or more nozzles, said rotary head being outside said filtering unit and said nozzles being directed so as to wash an external wall of said filtering unit.

12. The process for vacuum-assisted pneumatic conveying of powder products or the like according to claim 11, wherein said loading is timed on the basis of a predetermined suction time.

13. The process for vacuum-assisted pneumatic conveying of powder products or the like according to claim 12, wherein said suction time can be set from 1 to 30 seconds.

14. The process for vacuum-assisted pneumatic conveying of powder products or the like according to claim 11, wherein said unloading is timed on the basis of a predetermined unloading time.

15. The process for vacuum-assisted pneumatic conveying of powder products or the like according to claim 14, wherein said unloading can be set from 1 to 30 seconds.

16. The process for vacuum-assisted pneumatic conveying of powder products or the like by means of the apparatus according to claim 1, comprising:
    loading said products into a container body of said apparatus,
    unloading said products, and
    backwashing a filtering unit of said apparatus,
    wherein said unloading comprises a breaching suitable for achieving an overpressure of said container of between 0.1 and 0.45 bar, said loading is timed on the basis of a predetermined suction time, and said timing of the loading comprises a delay in the opening of the product inlet valve with respect to operation of the vacuum pump.

* * * * *